(12) United States Patent
Watanabe et al.

(10) Patent No.: US 10,162,578 B2
(45) Date of Patent: Dec. 25, 2018

(54) INFORMATION DISTRIBUTION SYSTEM, INFORMATION DISTRIBUTION APPARATUS, ELECTRONIC APPARATUS AND INFORMATION DISTRIBUTION METHOD

(71) Applicants: Hidehiko Watanabe, Kanagawa (JP); Hiroshi Kakii, Tokyo (JP); Junya Jimbo, Tokyo (JP); Naoki Chiyo, Kanagawa (JP)

(72) Inventors: Hidehiko Watanabe, Kanagawa (JP); Hiroshi Kakii, Tokyo (JP); Junya Jimbo, Tokyo (JP); Naoki Chiyo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/328,118

(22) PCT Filed: Aug. 26, 2015

(86) PCT No.: PCT/JP2015/004300
§ 371 (c)(1),
(2) Date: Jan. 23, 2017

(87) PCT Pub. No.: WO2016/038826
PCT Pub. Date: Mar. 17, 2016

(65) Prior Publication Data
US 2017/0212714 A1    Jul. 27, 2017

(30) Foreign Application Priority Data

Sep. 8, 2014 (JP) .................................. 2014-181900
Aug. 10, 2015 (JP) .................................. 2015-158315

(51) Int. Cl.
  *G06F 3/12*    (2006.01)
  *G06F 13/00*   (2006.01)
  *H04N 1/00*    (2006.01)

(52) U.S. Cl.
  CPC .......... *G06F 3/1229* (2013.01); *G06F 3/1204* (2013.01); *G06F 3/1219* (2013.01);
  (Continued)

(58) Field of Classification Search
  CPC combination set(s) only.
  See application file for complete search history.

(56) References Cited

U.S. PATENT DOCUMENTS 7,254,563 B1 *  8/2007  Gelfer ............... G07B 17/0008
                                               705/401
7,340,501 B2 *  3/2008  Miida ................. G06F 11/3013
                                              707/999.001
(Continued)

FOREIGN PATENT DOCUMENTS

JP  2000-332929   11/2000
JP  2002-297804   10/2002
(Continued)

OTHER PUBLICATIONS

Extended European Search Report for 15840041.6 dated Aug. 28, 2017.
(Continued)

*Primary Examiner* — Dung D Tran
(74) *Attorney, Agent, or Firm* — IPUSA, PLLC

(57) ABSTRACT

There is provided an information distribution system including an electronic apparatus and an information distribution apparatus connected through a network, the information distribution apparatus comprising an apparatus usage information collection unit configured to collect apparatus usage information indicating usage situation of the electronic
(Continued)

apparatus; a distribution information generating unit configured to generate distribution information to be distributed to the electronic apparatus based on the apparatus usage information; and a distribution unit configured to distribute the distribution information to the electronic apparatus; the electronic apparatus comprising a distribution information acquiring unit configured to acquire the distribution information; and a display control unit configured to display the distribution information in a display unit of the electronic apparatus.

15 Claims, 13 Drawing Sheets

(52) U.S. Cl.
CPC ............ *G06F 3/1288* (2013.01); *G06F 13/00* (2013.01); *H04N 1/00127* (2013.01); *H04N 1/00204* (2013.01); *H04N 2201/0094* (2013.01)

(56) References Cited

U.S. PATENT DOCUMENTS

| | | | | |
|---|---|---|---|---|
| 7,962,050 B2* | 6/2011 | Shustef | ............... | G03G 15/55 399/79 |
| 8,489,467 B2* | 7/2013 | Price | ............... | G06Q 30/0601 705/26.62 |
| 8,508,770 B2* | 8/2013 | Lee | ............... | G06K 15/4055 347/192 |
| 8,917,408 B2* | 12/2014 | Bovenzi | ............... | G06Q 10/06 358/1.14 |
| 8,954,350 B2* | 2/2015 | Nagai | ............... | G06Q 10/00 705/21 |
| 2004/0156489 A1* | 8/2004 | Vishik | ............... | H04L 12/66 379/102.03 |
| 2008/0126228 A1* | 5/2008 | Nagai | ............... | G06Q 10/00 705/28 |
| 2009/0257759 A1* | 10/2009 | Shustef | ............... | G03G 15/55 399/8 |
| 2012/0057197 A1 | 3/2012 | Matsuda | | |
| 2012/0176636 A1* | 7/2012 | Ormond | ............... | G06Q 10/087 358/1.13 |
| 2012/0303493 A1* | 11/2012 | Ishii | ............... | G06Q 10/08 705/28 |
| 2014/0176972 A1* | 6/2014 | Burke, Jr. | ............... | G06K 9/60 358/1.13 |
| 2014/0359260 A1* | 12/2014 | Utsumi | ............... | G06F 9/4418 713/1 |
| 2015/0063952 A1* | 3/2015 | Kawai | ............... | B65H 15/00 412/19 |
| 2016/0062293 A1* | 3/2016 | Nakamura | ............... | G03G 15/553 399/8 |
| 2016/0301812 A1* | 10/2016 | Kelly | ............... | G06F 3/121 |

FOREIGN PATENT DOCUMENTS

| | | |
|---|---|---|
| JP | 2004-185099 | 7/2004 |
| JP | 2007-140816 | 6/2007 |
| JP | 2011-238155 | 11/2011 |
| JP | 2013-161360 | 8/2013 |
| JP | 2014-049003 | 3/2014 |

OTHER PUBLICATIONS

International Search Report dated Nov. 17, 2015 in PCT/JP2015/004300 filed on Aug. 26, 2015.

* cited by examiner

[Fig. 1]
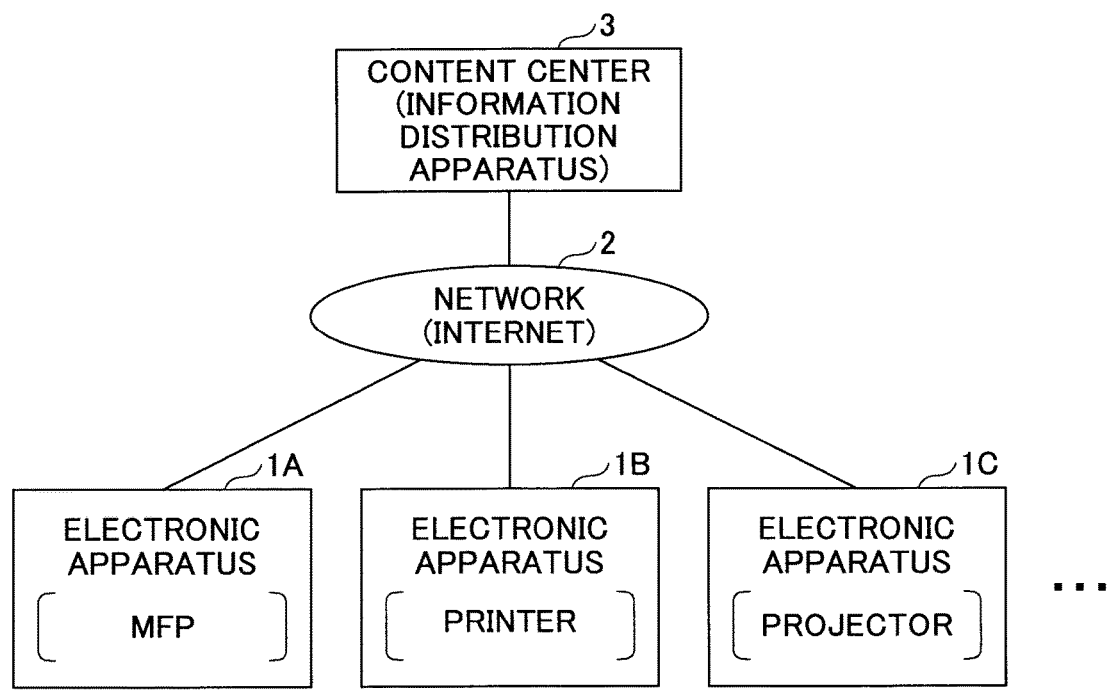

[Fig. 2]
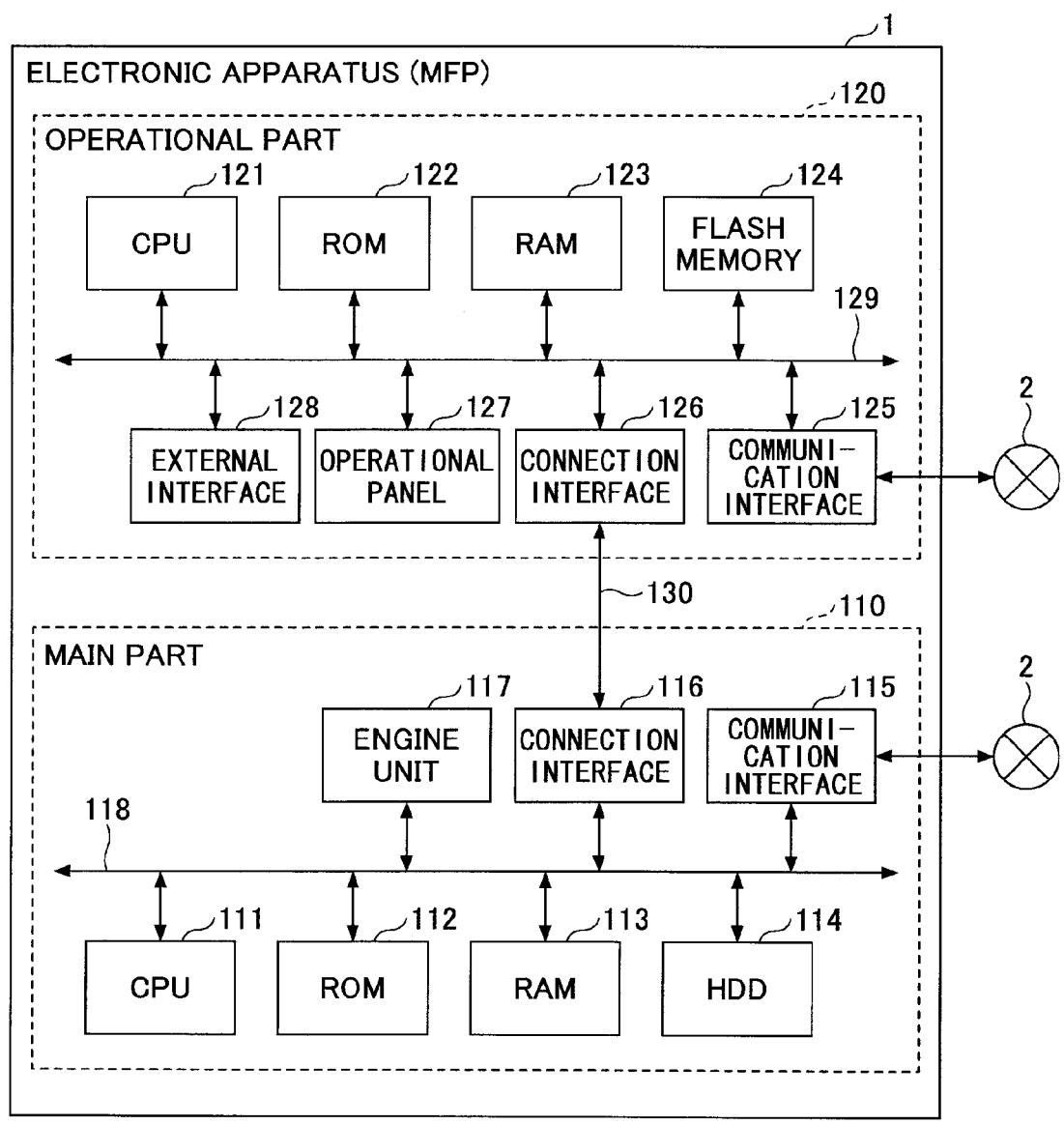

[Fig. 3]
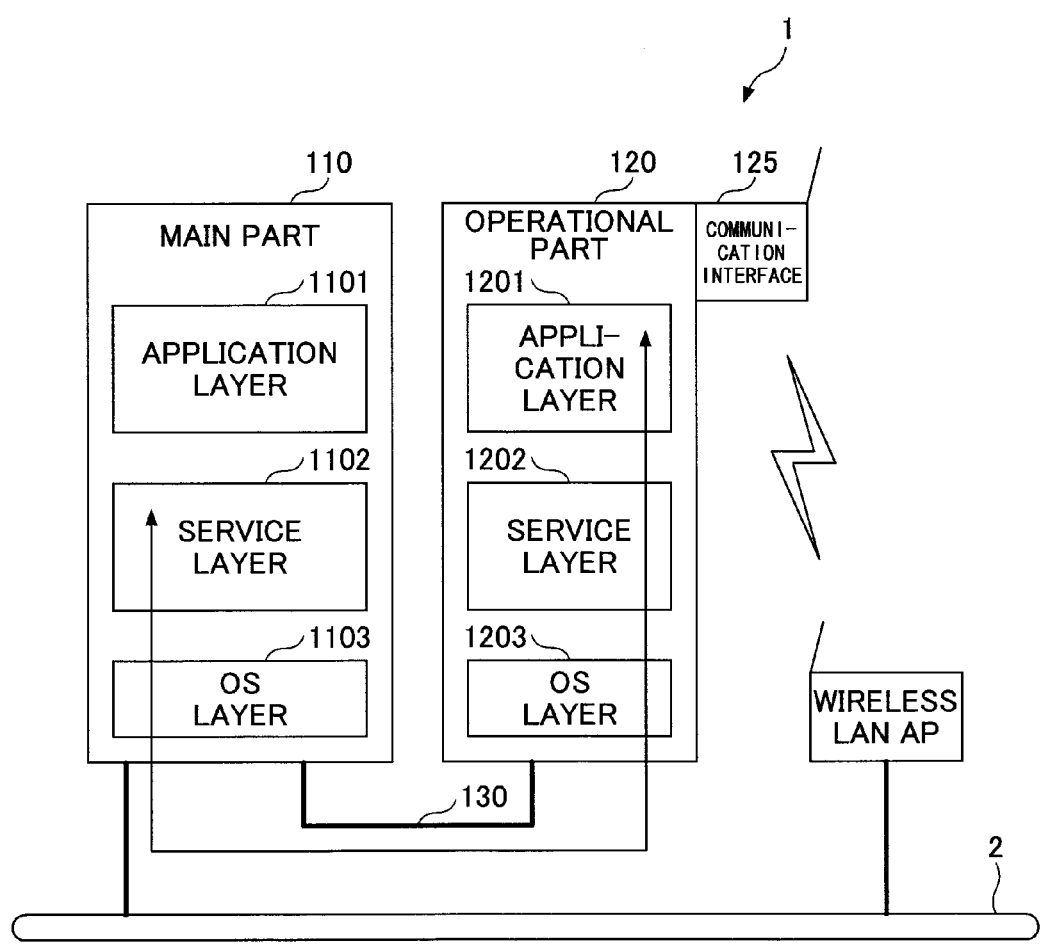

[Fig. 4]
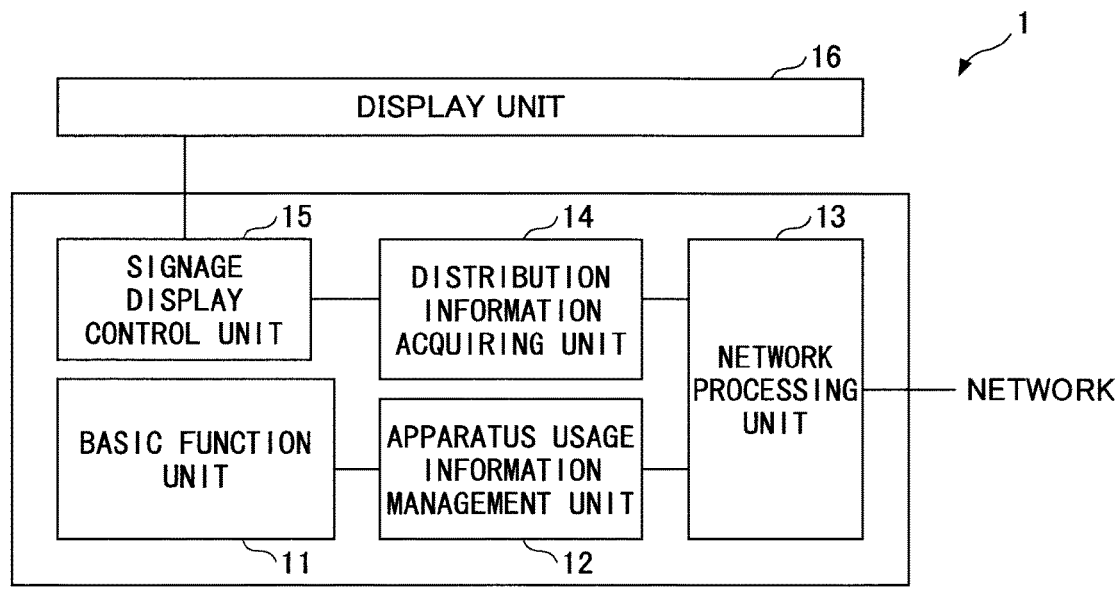
[Fig. 5]
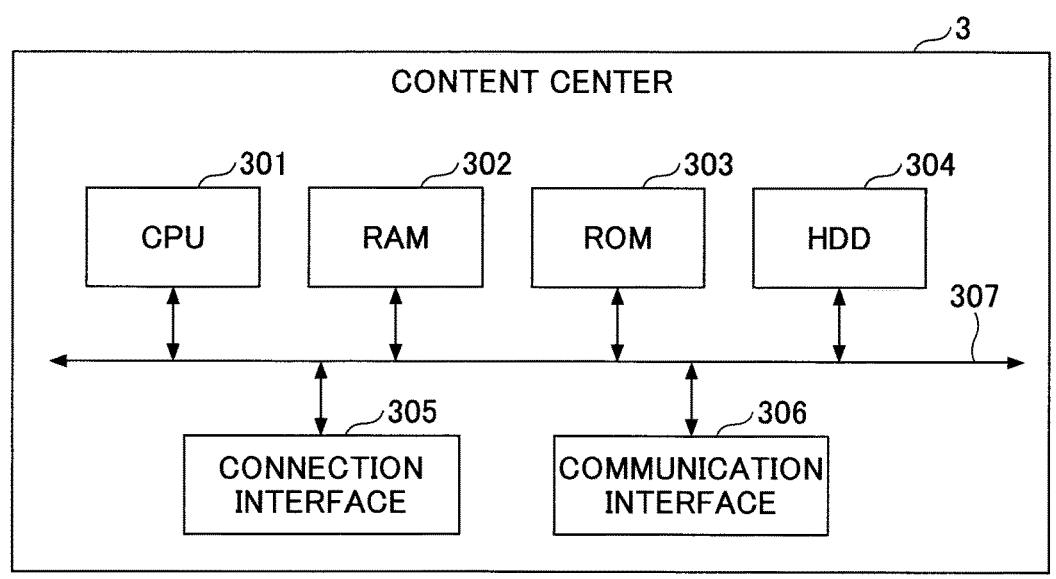

[Fig. 6]
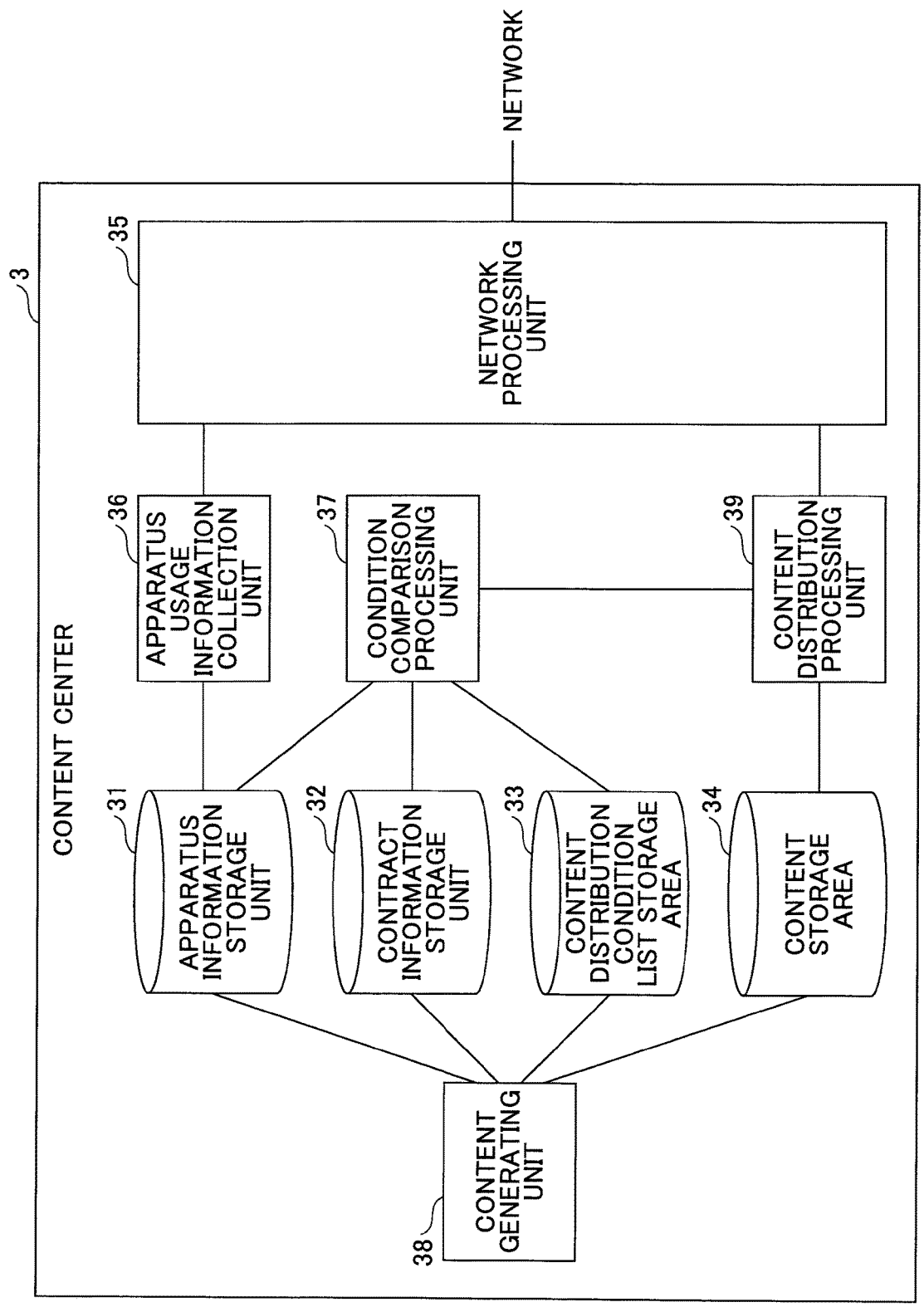

[Fig. 7]
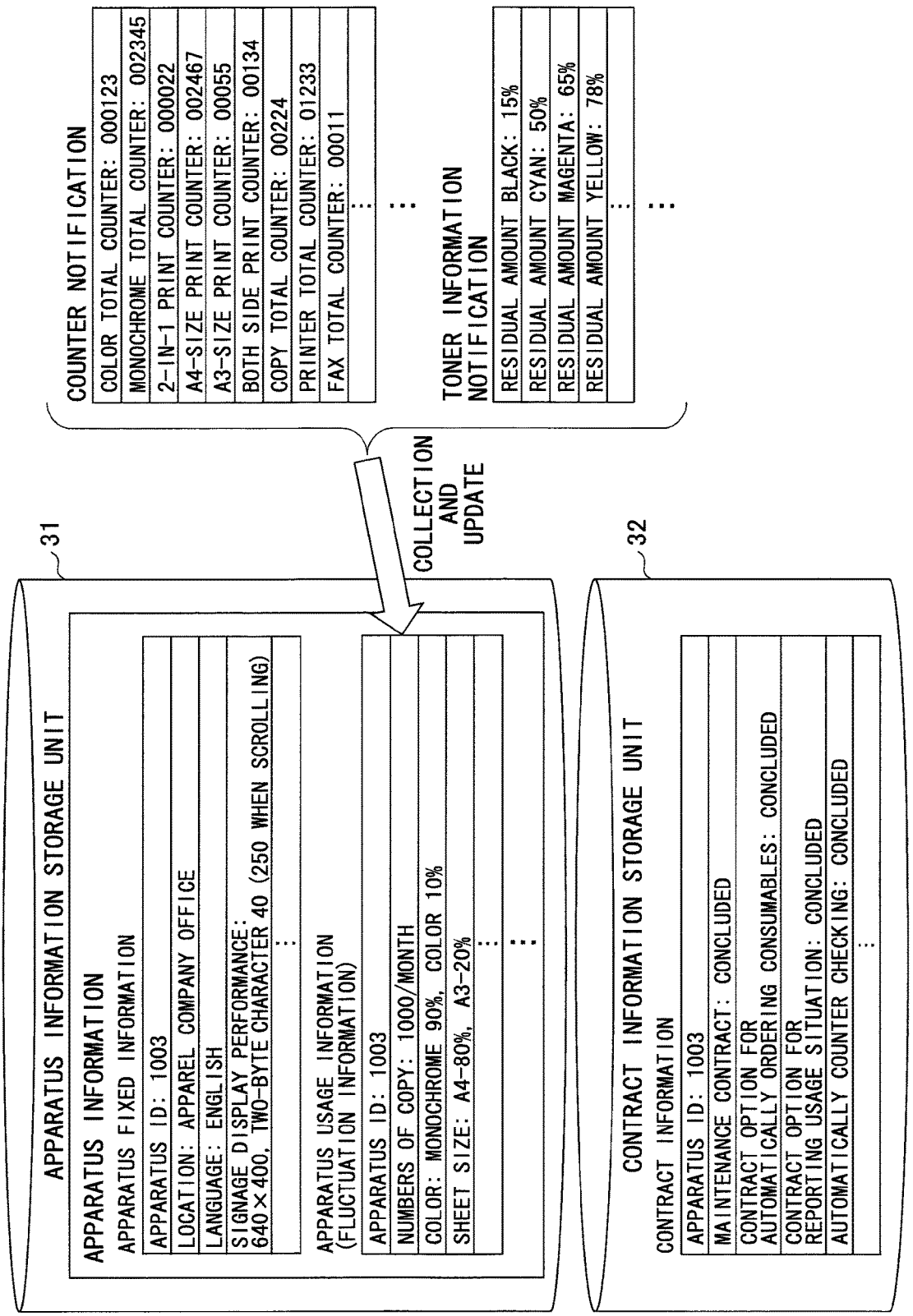

[Fig. 8]
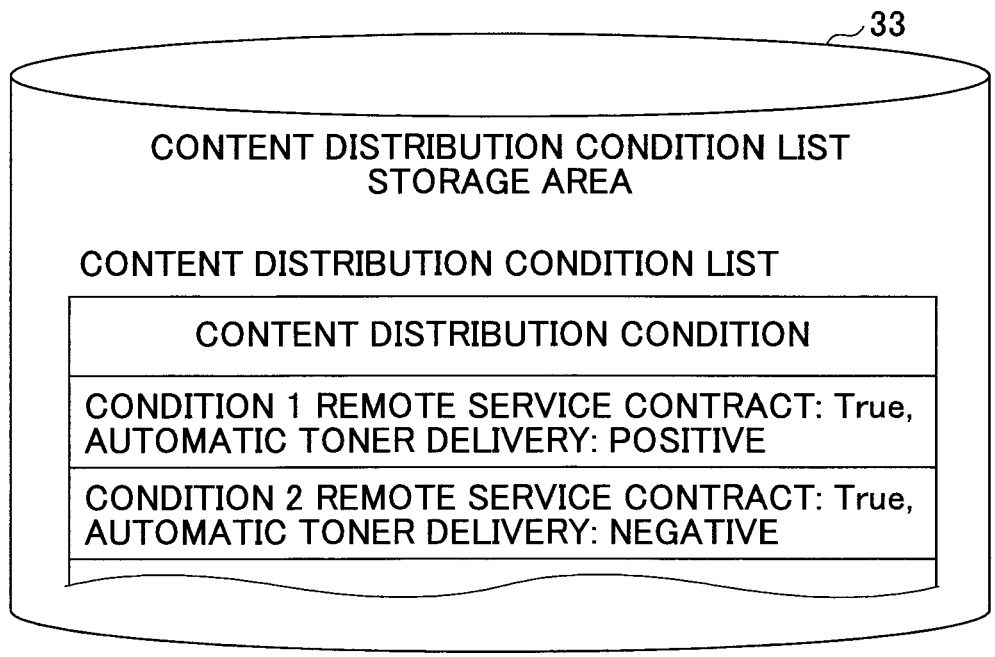
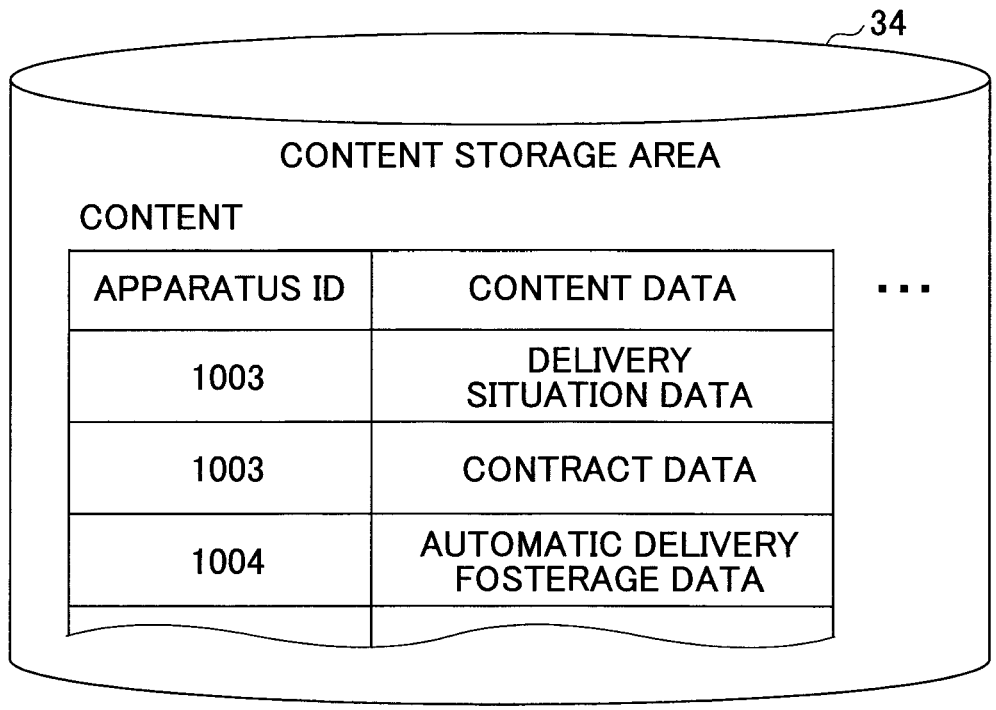

[Fig. 9]

TONER DELIVERY SITUATION

APPARATUS NUMBER : 3F13-110087

DESTINATION : A COMPANY B BRANCH DEMONSTRATION MACHINE

| ORDER DATE | PRODUCT | SITUATION |
|---|---|---|
| 01/01/2015 | MP P TONER – BLACK C5002 | FORWARDED (ESTIMATED DELIVERY DATE 01/02/2015) |
| 02/10/2015 | MP P TONER – CYAN C5002 | FORWARDED (ESTIMATED DELIVERY DATE 02/11/2015) |
| 02/19/2015 | MP P TONER – BLACK C5002 | FORWARDED (ESTIMATED DELIVERY DATE 02/20/2015) |
| 02/25/2015 | MP P TONER – MAGENTA C5002 | FORWARDED RETURN |
| 03/07/2015 | MP P TONER – BLACK C5002 | FORWARDED (ESTIMATED DELIVERY DATE 03/07/2015) |
| 03/10/2015 | MP P TONER – YELLOW C5002 | FORWARDED RETURN |
| 03/11/2015 | MP P TONER – BLACK C5002 | FORWARDED (ESTIMATED DELIVERY DATE 03/12/2015) |
| 03/12/2015 | MP P TONER – BLACK C5002 | FORWARDED (ESTIMATED DELIVERY DATE 03/13/2015) |

[Fig. 10]
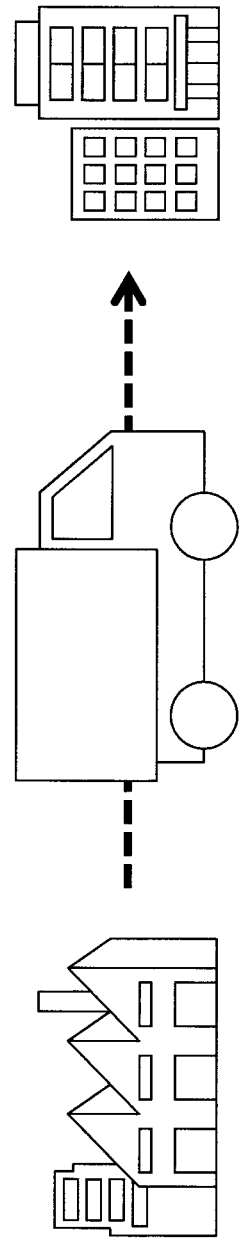

[Fig. 11]
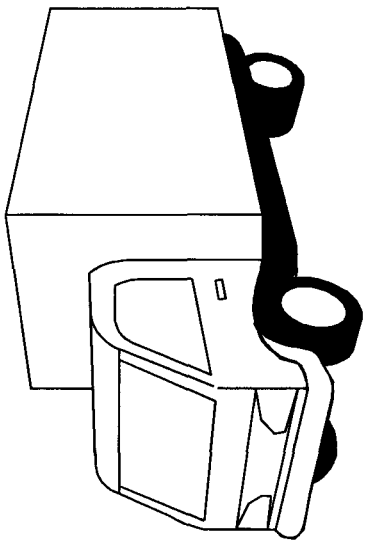

[Fig. 12]
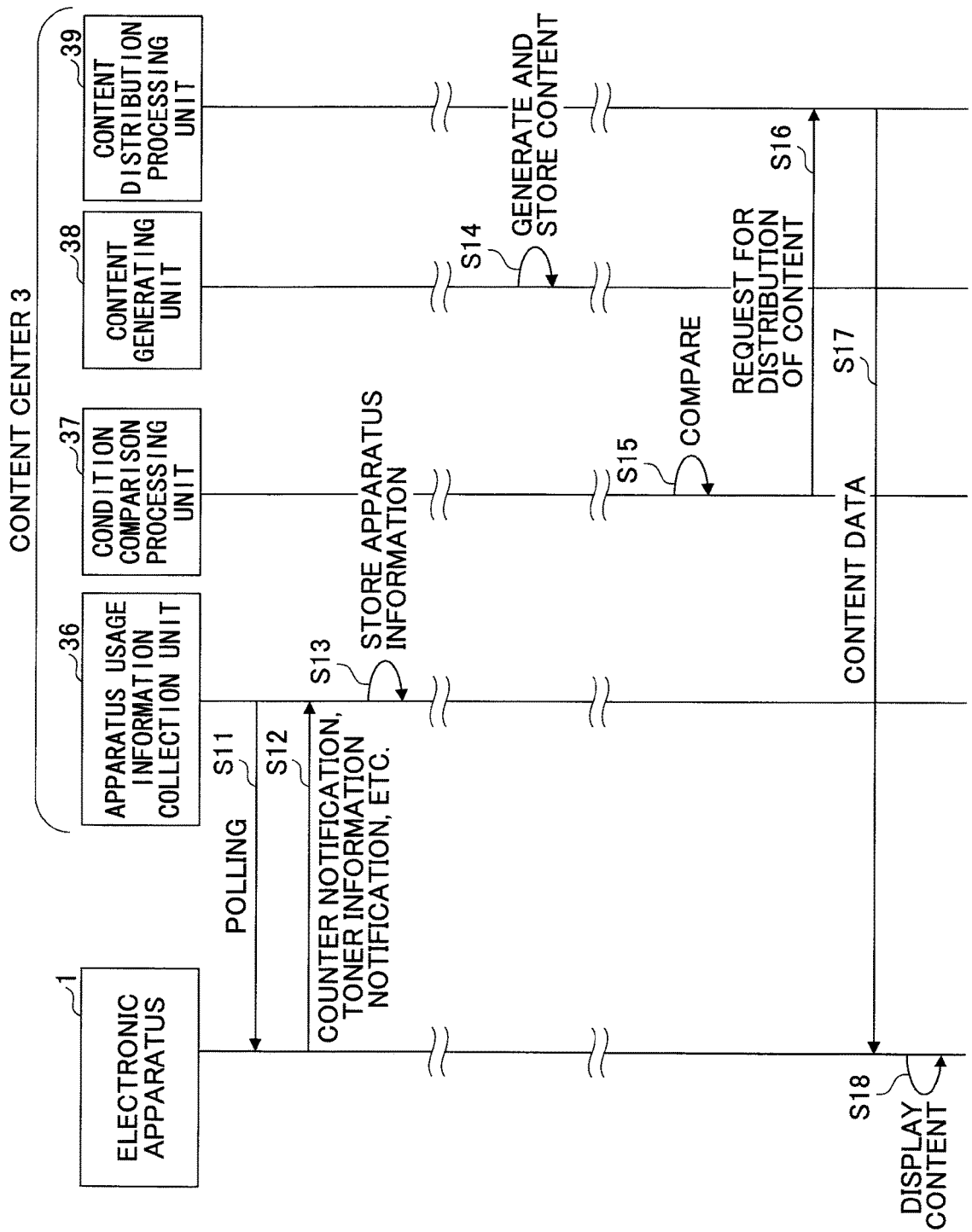

[Fig. 13]
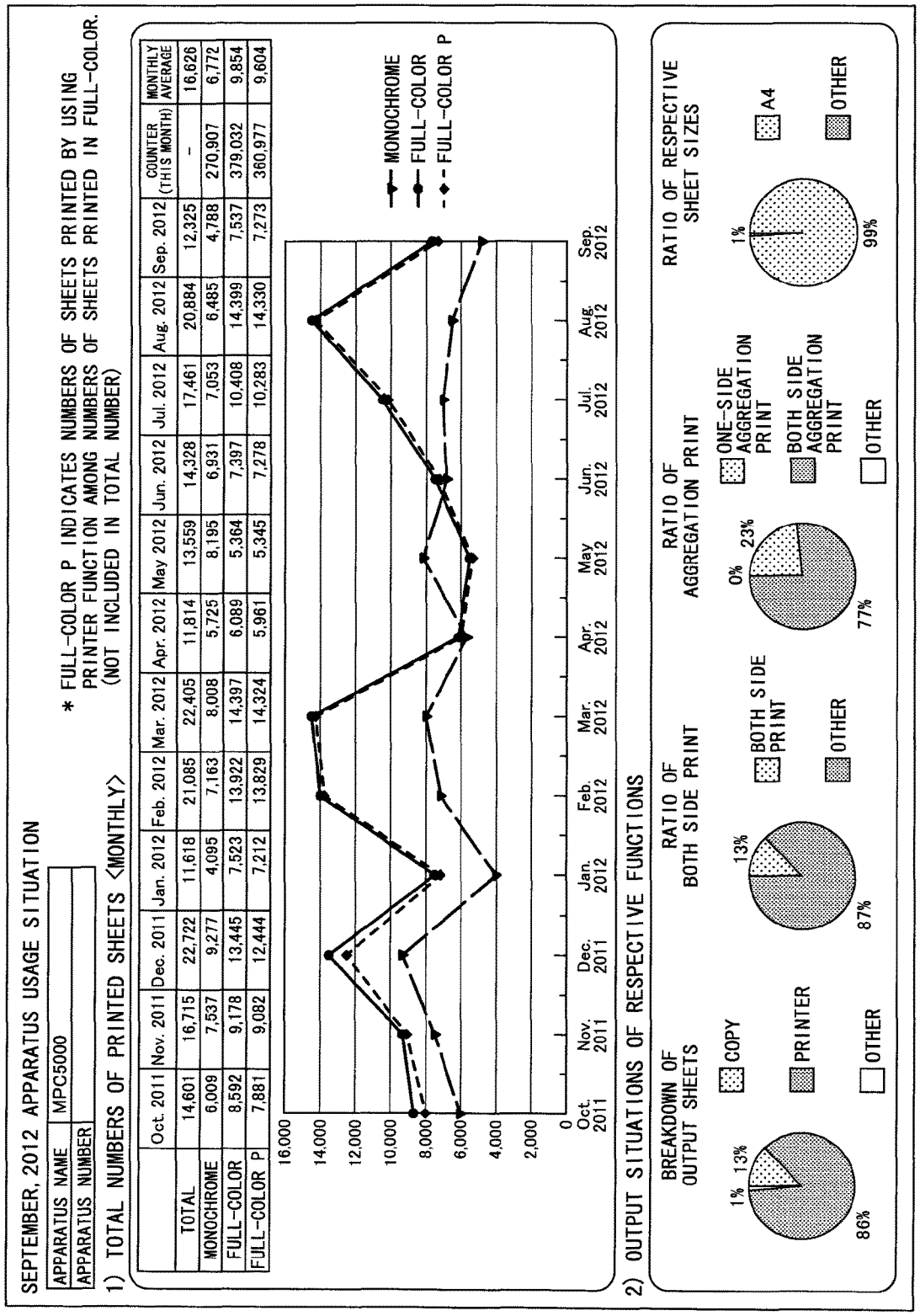

[Fig. 14]

TONER DELIVERY SITUATION

CONTRACT STATE : AUTOMATICALLY TONNER DELIVERING UPON REPLACING TONNER

DESTINATION NAME : HEAD OFFICE

DESTINATION ADDRESS : MINATO-KU, TOKYO

| ORDER DATE | PRODUCT | TYPE | STATE |
|---|---|---|---|
| 2014/06/01 | TONNER (CYAN) | AUTOMATIC | DELIVERED (06/02/2014) |
| 2014/06/10 | TONNER (MAGENTA) | AUTOMATIC | DELIVERED (06/11/2014) |
| 2014/06/19 | TONNER (BLACK) | TELEPHONE | CANCEL (06/20/2014) |
| 2014/06/25 | TONNER (MAGENTA) | AUTOMATIC | DELIVERED (06/26/2014) |
| 2014/07/07 | TONNER (BLACK) | TELEPHONE | FORWARDED (07/08/2014) |

CONTRACT STATE

- AUTOMATICALLY TONNER DELIVERING : CONCLUDED (ORDER UPON REPLACING)
- AUTOMATICALLY COUNTER CHECKING : CONCLUDED (20th IN EVERY MONTH)
- REMOTE TEST : IN-SEVICE
- REMOTE FIRMWARE UPDATE : IN-SEVICE
- USAGE SITUATION REPORT : IN-SERVICE (20th IN EVERY MONTH)

INFORMATION DISTRIBUTION SYSTEM, INFORMATION DISTRIBUTION APPARATUS, ELECTRONIC APPARATUS AND INFORMATION DISTRIBUTION METHOD

TECHNICAL FIELD

The present technology relates to an information distribution system, an information distribution apparatus, an electronic apparatus and an information distribution method.

BACKGROUND ART

Some of the users of an electronic apparatus such as a multifunction peripheral, a printer, a fax machine or a projector, need to know various information items about the electronic apparatus. For example, a user, whose function is an administrator, etc., may need to know the usage situation of the electronic apparatus in view of cost reduction, and the like.

A system has been proposed, which enables a user to know the usage situation by accessing a certain server (for example, see Patent Document 1).

However, since the aforementioned system allows the user to refer to the usage situation through a network, there is a time lag from accessing the server to obtaining the usage situation. Therefore, it is not so easy to confirm the usage situation when using the electronic apparatus.

CITATION LIST

Patent Literature

[PTL 1]: Japanese Laid-open Patent Publication No. 2000-332929

SUMMARY OF INVENTION

Technical Problem

An object of disclosure of the present technology is to provide information required by a user.

Solution to Problems

According to an embodiment of the present invention, there is provided an information distribution system comprising: an electronic apparatus and an information distribution apparatus connected through a network, the information distribution apparatus including an apparatus usage information collection unit configured to collect apparatus usage information indicating a usage situation of the electronic apparatus; a distribution information generating unit configured to generate distribution information to be distributed to the electronic apparatus based on the apparatus usage information; and a distribution unit configured to distribute the distribution information to the electronic apparatus; the electronic apparatus including a distribution information acquiring unit configured to acquire the distribution information; and a display control unit configured to display the distribution information in a display unit of the electronic apparatus.

Advantageous Effects of Invention

According to the disclosed technology, information required by a user can be provided.

BRIEF DESCRIPTION OF DRAWINGS

FIG. 1 is a diagram for illustrating an example system configuration of a first embodiment.

FIG. 2 is a diagram for illustrating an example hardware configuration of an electronic apparatus.

FIG. 3 is a diagram for illustrating example layers of software of the electronic apparatus.

FIG. 4 is a diagram for illustrating an example software configuration of the electronic apparatus.

FIG. 5 is a diagram for illustrating an example hardware configuration of a content center.

FIG. 6 is an example software configuration of the content center.

FIG. 7 is a diagram for illustrating a data structure of apparatus information, contract information, and respective notifications.

FIG. 8 is a diagram for illustrating a data structure of the content distribution condition list and the content item.

FIG. 9 is a diagram for illustrating an example of delivery situation data.

FIG. 10 is a diagram for illustrating an example of contract data.

FIG. 11 is a diagram for illustrating an example of automatic delivery fosterage data.

FIG. 12 is a sequence diagram for illustrating an example process of the present embodiment.

FIG. 13 is a diagram showing an example usage situation report as distribution information.

FIG. 14 is a diagram showing example content items of toner delivery situation and contract state.

DESCRIPTION OF EMBODIMENTS

In the following, embodiments will be described with reference to accompanied drawings. Additionally, in the following embodiments, although descriptions are given assuming that a content distribution method for displaying signage is used for information distribution, the information distribution method may be independent from the signage.

<Configuration>

FIG. 1 is a diagram for illustrating an example system configuration of the present embodiment. In FIG. 1, content that is information to be distributed is collectively stored in a content center (information distribution apparatus and server apparatus) 3, and data thereof is distributed to electronic apparatuses 1A, 1B, 1C, etc., through a network 2. Apparatuses, such as MFPs (Multi-Function Peripheral, or Multi-Function Printer), printers or projectors, having a signage function and usage situation notification function with which the apparatuses can report and display apparatus usage information and content are exemplified as the electronic apparatuses 1A, 1B, 1C, and the like. The respective electronic apparatuses 1A, 1B, 1C, etc., have unique apparatus IDs (identification information). The content center 3 periodically collects the apparatus usage information associated with the respective apparatus IDs to perform remote maintenance and management, and it has a function for distributing diverse content items to the respective electronic apparatuses of the apparatus IDs.

FIG. 2 is a diagram for illustrating an example hardware configuration of the electronic apparatus 1. In this case, a MFP is exemplified. In FIG. 2, the electronic apparatus 1 includes a main part 110, which achieves functions such as a copy function, a scanner function, a facsimile function or a printer function, and an operational part 120 for accepting user's operations. Additionally, the term "accepting user's operations" is used to refer to a concept in which accepting information (including signals for indicating coordinate values in a screen, etc.,) input in accordance with the user's operations is included. The main part 110 and the operational part 120 are coupled through a dedicated communication path 130 in a manner where they can communicate with each other. For example, the communication path 130 may comply with the USB (Universal Serial Bus) standard. However, it may comply with an arbitrary standard for wired or wireless communication. Additionally, the main part 110 can be operated according to the operations accepted in the operational part 120. Also, the main part 110 can communicate with an external device such as a client PC, and it may be operated according to instructions received from the external device.

The main part 110 includes a CPU (Central Processing Unit) 111, a ROM (Read Only Memory) 112, a RAM (Random Access Memory) 113, a HDD (Hard Disk Drive) 114, a communication interface 115, a connection interface 116 and an engine unit 117, where the respective elements or units are connected with each other through a system bus 118.

The CPU 111 integrally controls the operations of the main part 110. The CPU 111 executes programs by retrieving them from the ROM 112 or the HDD 114 to load them into the RAM 113 that serves as a work area so as to control the entire operation of the main part 110, thereby achieving the respective functions such as the copy function, the scanner function, or the printer function. The communication interface 115 is for connecting to the network 2. The connection interface 116 is for communicating with the operational part 120 through the communication path 130. The engine unit 117 is hardware for achieving the copy function, the scanner function, the facsimile function and the printer function, thereby performing processes other than generic information processing and communication processing. For example, the engine unit 117 includes a scanner (image reading unit) for scanning an image of a document to read it, a plotter (image forming unit) for printing an image on a sheet, etc., and a facsimile unit for performing fax communication. Further, the engine unit 117 may include certain optional equipment such as a finisher for sorting the printed sheet, an ADF (Auto Document Feeder) for automatically feeding the document, etc.

The operational part 120 includes a CPU 121, a ROM 122, a RAM 123, a flash memory 124, a communication interface 125, a connection interface 126, an operational panel 127 and an external interface 128, where the respective elements or units are connected with each other through a system bus 129. The CPU 121 integrally controls the operations of the operational part 120. The CPU 121 executes programs retrieving them from the ROM 122 or the flash memory 124 to load them into the RAM 123 that serves as a work area so as to control entire operation of the operational part 120, thereby achieving respective functions such as display of information (image) according to the accepted user's input. The communication interface 125 is for connecting to the network 2. The connection interface 126 is for communicating with the main part 110 through the communication path 130. The operational panel 127 accepts respective inputs according to the user's operations and display respective information items (for example, information according to the accepted operation, information indicating an operational state of the electronic apparatus 1, information indicating a setting state, and the like). Here, although a LCD (Liquid Crystal Display) device with a touch panel is assumed as the operational panel 127, this is not a limiting example. For example, the operational panel 127 may be composed of an organic EL (Electro-Luminescence) display device with the touch panel. Further, in addition to or instead of the aforementioned device, an operational unit such as a numeric keypad or a display unit such as an indicator lamp may be included. The external interface 128 is for connecting to an IC card reader or the like.

FIG. 3 is a diagram for illustrating example layers of software of the electronic apparatus 1. In this case, the MFP is exemplified. In FIG. 3, the main part 110 includes an application layer 1101, a service layer 1102 and an OS layer 1103. Substantially, the application layer 1101, the service layer 1102 and the OS layer 1103 are composed of the software stored in the ROM 112 or the HDD 114, etc., shown in FIG. 2. Respective functions of the layers are achieved by executing the software with the CPU 111.

Software of the application layer 1101 is application software (hereinafter, it may be referred to as "app") for providing a certain function by operating hardware resources. For example, a copy app for providing the copy function, a scanner app for providing a scanner function, a fax app for providing a facsimile function, a printer app for providing a printer function, etc., are exemplified as the app.

The software of the service layer 1102 is disposed between the application layer 1101 and the OS layer 1103, and is software for providing the app with an interface to use hardware resources included in the main part 110. More specifically, the software of the service layer 1102 provides functions for accepting a request for operating the hardware resource (operation request) and for arbitrating the operation request. Requests for reading with the scanner, printing with the plotter, etc., are exemplified as the operational request accepted by the service layer 1102. Additionally, the interface function of the service layer 1102 is provided not only to the application layer 1101 of the main part 110 but also to the application layer 1201 of the operational part 120. That is, apps in the application layer 1201 of the operational part 120 can also achieve the functions using the hardware resources (for example, the engine unit 117) of the main part 110 through the interface function of the service layer 1102.

The software of the OS layer 1103 is software (operating system) for providing basic functions for controlling the hardware resources included in the main part 110. The software of the service layer 1102 transmits requests for usage of the hardware resources from the respective apps to the OS layer 1103, while converting the requests into commands which can be interpreted by the OS layer 1103. The hardware resources are operated in accordance with the request from the apps when the software of the OS layer 1103 processes the commands.

Similarly, the operational part 120 includes an application layer 1201, a service layer 1202 and an OS layer 1203. The layer structure of the application layer 1201, the service layer 1202 and the OS layer 1203 included in the operational part 120 is similar to that of the main part 110. However, functions provided by the apps in the application layer 1201, and types of operational requests acceptable with the service layer 1202 are different from those in the main part 110. Although the apps in the application layer 1201 may be software for providing certain functions by operating the hardware resources included in the operational panel 120, they mainly provide functions of UI (User Interface) for operating or displaying functions (the copy function, the scanner function, the facsimile function, and the printer function) included in the main part 110.

Additionally, in the example shown in FIG. 3, in order to keep independence of each function, the software of the OS layer 1103 in the main part 110 and the software of the OS layer 1203 in the operational part 120 are different from each other. That is, the main part 110 and the operational part 120 are independently operated with discrete operating systems. For example, the software of the OS layer 1103 in the main part 110 may be Linux, while the software of the OS layer 1203 in the operational part 120 may be Android.

Since the main part 110 and the operational part 120 are operated with the discrete operating systems, communications between the main part 110 and the operational part 120 are not inter-process communications performed within the same apparatus but communications performed between discrete apparatuses. An operation for transmitting the information (instruction from user) accepted by the operational part 120 to the main part 110, and operation for reporting an event from the main part 110 to the operational part 120, etc., is exemplified as the aforementioned communication. Here, the operational part 120 can use the function of the main part 110 by performing a command communication with the main part 110. Also, an operation state of the main part 110, setting content such as parameter setting in the main part 110, etc., is exemplified as the event reported from the main part 110 to the operational part 120. Also, since electric power is supplied from the main part 110 to the operational part 120 through the communication path 130, power supply to the operational part 120 can be controlled independently of that to the main part 110.

FIG. 4 is a diagram for illustrating an example software configuration of the electronic apparatus 1. In FIG. 4, the electronic apparatus 1 includes a basic function unit 11, an apparatus usage information management unit 12, a network processing unit 13, a distribution information acquiring unit 14, a signage display control unit 15 and a display unit 16.

The basic function unit 11 is for achieving functions originally essential to the electronic apparatus 1. For example, the basic function unit 11 is used to operate the electronic apparatus 1 as the MFP, the printer, or the projector.

The apparatus usage information management unit 12 collects information items, which vary according to the usage situation of the electronic apparatus 1, to report the collected information items to the content center 3.

The network processing unit 13 performs a process of reporting to the content center 3 through the network 2 in response to receiving a report request from the apparatus usage information management unit 12, and performs a process for transmitting content received from the content center 3 through the network 2 to the distribution information acquiring unit 14.

The distribution information acquiring unit 14 receives the content from the network processing unit 13 to transmit it to the signage display control unit 15.

The signage display control unit 15 displays the content received from the content center 3. The display unit 16 corresponds to an operational panel 127 in a case where the electronic apparatus 1 is the MFP or the printer, it corresponds to panel display unit (not shown) in a case where the electronic apparatus 1 is a printer, while it corresponds to a projection unit for projecting an image to a screen in a case where the electronic apparatus 1 is the projector.

The functions of the respective units (the basic function unit 11, the apparatus usage information management unit 12, the network processing unit 13, the distribution information acquiring unit 14, the signage display control unit 15 and the display unit 16) included in the electronic apparatus (MFP) of the present embodiment described above are achieved by executing the programs stored in a storage device (such as the ROM 112, the HDD 114, the ROM 122, or the flash memory 124) by the CPU (CPU 111 or CPU 121). However, for example, at least a part of the functions of the respective units included in the electronic apparatus (MFP) 1 may be achieved by dedicated hardware circuits (such as a semiconductor integrated circuit).

Further, in the electronic apparatus 1 of the present embodiment, the basic function unit 11 may be achieved by executing the programs stored in the ROM 112, the HDD 114, etc., by the CPU 111 of the main part 110. Also, for example, the programs by which the basic function unit 11 is achieved may be included in the application layer 1101 of the main part 110.

Further, in the electronic apparatus 1 of the present embodiment, the signage display control unit 15 and the display unit 16 may be achieved by executing the programs stored in the ROM 122, the flash memory 124, etc., by the CPU 121 of the operational part 120. Also, for example, the programs by which the signage display control unit 15 and the display unit 16 are achieved may be included in the application layer 1201 of the operational part 120.

Further, in the electronic apparatus 1 of the present embodiment, the apparatus usage information management unit 12, the network processing unit 13 and the distribution information acquiring unit 14 may be achieved by executing the programs stored in the ROM 112, the HDD 114, the ROM 122, the flash memory 124, etc., by the CPU 111 of the main part 110 or the CPU 121 of the operational part 120.

Also, the apparatus usage information management unit 12, the network processing unit 13 and the distribution information acquiring unit 14 may be included in any of the application layer 1101 of the main part 110 and the application layer 1201 of the operational part 120.

FIG. 5 is a diagram for illustrating an example hardware configuration of the content center 3. In FIG. 5, the content center 3 includes a CPU 301, a RAM 302, a ROM 303, a HDD 304, a connection interface 305 and a communication interface 306, which are connected with each other through the bus 307. The CPU 301 integrally controls operations of the content center 3 by executing programs retrieving them from the ROM 303, HDD 304, etc., to load them into the RAM 302 that serves as a work area. The connection interface 305 is an interface for connecting a device with the content center 3. The communication interface 306 is an interface for communicating with another information processing apparatus through the network 2 (see FIG. 1).

FIG. 6 is an example software configuration of the content center 3. In FIG. 6, the content center 3 includes, as its storage area, an apparatus information storage unit 31, a contract information storage unit 32, a content distribution condition list storage area 33 and a content storage area 34. Also, the content center 3 includes a network processing unit 35, an apparatus usage information collection unit 36, a condition comparison processing unit 37, a content generating unit 38 and a content distribution processing unit 39.

The apparatus information storage unit 31 stores latest apparatus information items about a plurality of (many) electronic apparatuses 1, where the apparatus information items correspond to the apparatus IDs. Detailed descriptions on the apparatus information will be given below. The contract information storage unit 32 stores contract information items corresponding to the respective apparatus IDs. Detailed descriptions on the contract information will be given below. The content distribution condition list storage area 33 stores a content distribution condition list in which conditions for distributing the content are described. Detailed descriptions on the content distribution condition list will be given below. The content storage area 34 stores content items to be distributed. Detailed descriptions on the content items will be given below.

The network processing unit 35 performs a process of transmitting the apparatus usage information to the apparatus usage information collection unit 36 upon receiving it from the network 2, and a process of transmitting a requested content item to the electronic apparatus 1 of the requested apparatus ID in response to the request from the content distribution processing unit 39.

The apparatus usage information collection unit 36 stores the apparatus information which has been updated based on the apparatus usage information received from the electronic apparatus 1 in the apparatus information storage unit 31.

The condition comparison processing unit 37 requests the content distribution processing unit 39 to distribute a content item to the electronic apparatus 1 identified by a detected apparatus ID, upon detecting the apparatus ID based on the apparatus information stored in apparatus information storage unit 31, the contract information stored in the contract information storage unit 32 and the content distribution condition list stored in the content distribution condition list storage area 33.

The content generating unit 38 generates, based on the apparatus information stored in the apparatus information storage unit 31, a content item on an apparatus ID-by-apparatus ID basis with reference to the contract information stored in the contract information storage unit 32, thereby storing the generated content item in the content storage area 34.

The content distribution processing unit 39 performs a process for distributing the requested content item stored in the content storage area 34 in response to receiving the distribution request.

The functions of the respective units (the network processing unit 35, the apparatus usage information collection unit 36, the condition comparison processing unit 37, the content generating unit 38 and the content distribution processing unit 39) included in the content center (information processing apparatus) 3 described above may be achieved by executing the programs stored in a storage device (such as the ROM 303, or the HDD 304) by the CPU 301. However, for example, at least a part of the respective units included in the content center 3 may be achieved by dedicated hardware circuits (such as a semiconductor integrated circuit).

Also, the apparatus information storage unit 31, the contract information storage unit 32, the content distribution condition list storage area 33 and the content storage area 34 provided as the storage area of the content center 3 are respectively certain storage areas included in the storage device (such as the ROM 303, or the HDD 304).

Further, the programs used in an information distribution system (composed of the electronic apparatus 1A, 1B, 1C, the content center 3, etc.,) of the present embodiment may be provided by storing them in a computer readable recording medium such as a CD-ROM, a flexible disk (FD), a CD-R, a DVD (Digital Versatile Disk), or a USB (Universal Serial Bus) being in an installable format or an executable format, or they may be provided through a network such as the Internet. Also, the respective programs are provided by having been installed in the ROM, etc., in advance.

FIG. 7 is a diagram for illustrating a data structure of the apparatus information, the contract information, and respective notifications. The apparatus information stored in the apparatus information storage unit 31 includes apparatus fixed information and apparatus usage information (fluctuation information).

The apparatus fixed information includes a location, a language, a signage display performance, and so on, which are associated with the apparatus ID. The apparatus fixed information is set in the content center 3 upon the apparatus being installed, or periodically reported with the fluctuation information. The apparatus fixed information is to be set for every electronic apparatus 1 and is unique to the electronic apparatus 1.

The apparatus usage information includes number of copies, a color, a sheet size, and so on, which are associated with the apparatus ID. That is, the apparatus usage information of the present embodiment is information varying according to the usage situation of the electronic apparatus 1 and indicates the usage situation of the electronic apparatus 1.

A counter notification or toner information notification sent from the electronic apparatus 1 is used to update the apparatus usage information. The counter notification or the toner information notification may be stored as it is, forming a part of the apparatus usage information. The apparatus usage information is periodically transmitted to the content center 3 from the electronic apparatus 1 whose maintenance contract has been concluded, and automatically updated by the content center 3 every month, etc., as management information. Usually, the management information is used for supplying sheets, charge, or the like.

The contract information stored in the contract information storage unit 32 is information indicating contracts for using the electronic apparatus 1. The contract information includes conclusion states corresponding to the respective apparatus IDs indicating whether the contract or contract option has been contracted, where the conclusion states are indicating those of the maintenance contract, the contract option for automatically ordering consumables, the reporting usage situation, the automatic counter checking, and the like, which are associated with the apparatus ID. These are registered in the contract information storage unit 32 by a center operator upon the apparatus being installed.

FIG. 8 is a diagram for illustrating a data structure of the content distribution condition list and the content item. The content distribution condition list stored in the content distribution condition list storage area 33 includes content distribution conditions. The content distribution conditions are exemplified as condition 1 and condition 2. Specifically, the condition 1 is met when a remote service contract and an automatic toner delivery contract are concluded in the contract information, while condition 2 is met when the remote service contract is contracted and the automatic toner delivery contract is not concluded in the contract information.

Additionally, other than the condition 1 and the condition 2, "a usage situation report is sent if the contract option for reporting the usage situation has been concluded and the apparatus information has been collected for a certain period", "a delivery state report is sent if the contract option for automatically ordering consumables has been concluded and order information is included in the apparatus information", "a contract state report is sent if the contract information has been recorded", etc., are exemplified as the content distribution conditions.

The content stored in the content storage area 34 includes apparatus IDs and data of the content items (content data).

Toner delivery situation data and contract data are stored in the content storage area 34 shown in FIG. 8 as the content data associated with the apparatus ID "1003". Also, automatic delivery fosterage data is stored in the content storage area 34 shown in FIG. 8 as the content data associated with the apparatus ID "1004".

Additionally, the content data may be the data itself, or may be reference information to the data such as an URI. Also, a display condition may be included in the content data. For example, in a case where the user whose function is the "administrator" logs in on the electronic apparatus 1, the user may give an instruction for displaying the content. Also, in order to prevent duplicate distributions, a distribution state indicating whether the content has been distributed may be recorded in the content item, or the content item having been distributed may be deleted or moved to another storage area.

In the following examples of the respective content data items stored in the content storage area 34 are described with reference to FIG. 9-FIG. 11.

FIG. 9 is a diagram for illustrating an example of delivery situation data. For example, the delivery situation data 91 shown in FIG. 9 is distributed to the electronic apparatus 1 corresponding to the apparatus ID "1003" and displayed. The delivery situation data 91 indicates a toner delivery situation, where the delivery destination is a company or a user of the electronic apparatus 1 corresponding to the apparatus ID "1003".

FIG. 10 is a diagram for illustrating an example of the contract data. For example, the contract data 92 shown in FIG. 10 is distributed to the electronic apparatus 1 corresponding to the apparatus ID "1003" and displayed. The contract data 92 indicates contracts concluded by the user of the electronic apparatus 1 corresponding to the apparatus ID "1003".

FIG. 11 is a diagram for illustrating an example of the automatic delivery fosterage data. For example, the automatic delivery fosterage data 93 shown in FIG. 11 is distributed to the electronic apparatus 1 corresponding to the apparatus ID "1004" and displayed. The automatic delivery fosterage data 93 indicates advantages of the automatic toner delivery.

For example, the content center 3 of the present embodiment searches for the electronic apparatus 1 which meets the condition 1 from the electronic apparatuses 1A, 1B, 1C, etc., and thereby distributes the content data to the electronic apparatus 1 which meets the condition 1. In the present embodiment, the electronic apparatus 1 corresponding to the apparatus ID "1003" meets the condition 1. Therefore, the delivery situation data 91 and the contract data 92 that are associated with the apparatus ID "1003" are distributed to the electronic apparatus 1 corresponding to the apparatus ID "1003".

Also, for example, the content center 3 searches for the electronic apparatus 1 which meets the condition 2 from the electronic apparatuses 1A, 1B, 1C, etc., and thereby distributes the content data to the electronic apparatus 1 which meets the condition 2. In the present embodiment, the electronic apparatus 1 corresponding to the apparatus ID "1004" meets the condition 2. Therefore, the automatic delivery fosterage data 93 that is associated with the apparatus ID "1004" are distributed to the electronic apparatus 1 corresponding to the apparatus ID "1004".

<Operation>

FIG. 12 is a sequence diagram for illustrating an example process of the present embodiment. In FIG. 12, the apparatus usage information collection unit 36 of the content center 3 periodically polls the electronic apparatus 1 through the network processing unit 35 (step S11), the apparatus information management unit 12 of the electronic apparatus 1 sends the counter notification, the toner information notification, etc., in response to the polling (step S12). Additionally, the electronic apparatus 1 may actively send the counter notification, the toner information notification, etc., to the content center 3 without waiting for the polling. For example, the electronic apparatus 1 periodically reports values of a color total counter for counting numbers of sheets printed in color, a monochrome total counter for counting numbers of sheets printed in monochrome, a 2-in-1 print counter for counting numbers of 2-in-1 printed sheets, an A4-size print counter and an A3-size print counter for counting the numbers of printed sheets having respective sheet size, a both side print counter, counter of each app (copy, printer, and fax), etc., to the content center 3 as the counter notification. Respective residual amounts of black toner, cyan toner, magenta toner and yellow toner are reported as the toner information notification.

The apparatus usage information collection unit 36 of the content center 3 updates the apparatus information with the counter notification or the toner information notification to store it in the apparatus information storage unit 31 (step S13).

Then, the content generating unit 38 of the content center 3 generates, based on the apparatus information stored in the apparatus information storage unit 31, the content item with reference to the contract information stored in the contract information storage unit 32, and stores it in the content storage area 34 (step S14). For example, electronic apparatuses for which the contract option for reporting the usage situation has been concluded are selected, thereby generating the content items based on the respective apparatus usage information items of the selected electronic apparatuses.

FIG. 13 is a diagram showing an example usage situation report as the distribution information. The usage situation report shown in FIG. 10 includes total numbers of printed sheets (printed surfaces) and output situations of respective functions. The total numbers of printed sheets includes a total numbers of the printed sheets, numbers of sheets printed in monochrome and sheets printed in full-color, and numbers of sheets printed by using the printer function among the numbers of sheets printed in full-color (full-color P). The output situations of respective functions includes a breakdown of the output sheets of the respective functions (copy, printer, etc.), a ratio of the both side print, a ratio of an aggregation print and an ratio of the respective sheet sizes (A4 or others).

FIG. 14 is a diagram showing example content items of the toner delivery situation and contract state. The content item of the toner delivery situation includes "contract", "destination name", "destination address", "order date", "product", "type" and "state". The content item of the contract state includes respective types of contract currently existing and conclusion states thereof.

The descriptions are continued to be given with reference to FIG. 12. The condition comparison processing unit 37 of the content center 3 compares the apparatus information stored in the apparatus information storage unit 31, the contract information stored in the contract information storage unit 32 and the content distribution condition list stored in the content distribution condition list storage area 33 on an apparatus ID-by-apparatus ID basis (step S15). For example, whether the contract option for reporting the usage situation is concluded and the apparatus usage information has been collected for a certain period is determined with reference to the contract information. Also, whether the contract option for automatically ordering consumables is concluded and the order information is included is determined with reference to the contract information and the apparatus information, or whether the contract information exists, etc., is determined.

In a case where any apparatus ID meets the content distribution condition, the condition comparison processing unit 37 of the content center 3 requests the content distribution processing unit 39 to distribute the content item (step S16).

In response to the request, the content distribution processing unit 39 of the content center 3 retrieves the content item (for example, the usage situation report) from the content storage area 34 to transmit it to the electronic apparatus 1 identified by the apparatus ID (step S17).

Upon receiving the content item (data), the electronic apparatus 1 displays the content item with the display unit 16 (see FIG. 4) through the distribution information acquiring unit 14 and the signage display control unit 15 (step S18). Additionally, when the user's operation is input in the electronic apparatus 1 or processes run, which cause the electronic apparatus 1 to be in a state hard to display the content item, display of the content item is delayed. Also, when a display condition (for example, display for only the user whose function is the administrator) is set in the content item, the content item is displayed in accordance with the display condition.

Additionally, in the example described above, although the content item is generated by the content generating unit 38 before the condition comparison processing unit 37 determines whether to distribute it, the content item may be generated by the condition comparison processing unit 37 upon the condition comparison processing unit 37 determining to distribute it.

Summary

As described above, according to the present embodiment, information required by a user can be provided.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. That is, it should be understood that the present invention is not limited to the specific embodiments and the accompanied drawings.

Terms in Embodiments and in Claims

The apparatus usage information collection unit 36 is an example of "apparatus usage information collection unit". The content generating unit 38 is an example of "distribution information generating unit". The content distribution processing unit 39 is an example of "distribution unit". The distribution information acquiring unit 14 is an example of "distribution information acquiring unit". The signage display control unit 15 is an example of "display control unit". The contract information storage unit 32 is an example of "storage unit". The contract option for automatically ordering consumables included in the contract information stored in the contract information storage unit 32 shown in FIG. 7 and automatic toner delivery contract shown in an example screen of FIG. 14 are examples of a service for automatically ordering.

The present application is based on Japanese Priority Application No. 2014-181900 filed on Sep. 8, 2014, and Japanese Priority Application No. 2015-158315 filed on Aug. 10, 2015, the entire contents of which are hereby incorporated herein by reference.

REFERENCE SIGNS LIST 1, 1A-1C electronic apparatus
11 basic function unit
12 apparatus usage information management unit
13 network processing unit
14 distribution information acquiring unit
15 signage display control unit
16 display unit
2 network
3 content center
31 apparatus information storage unit
32 contract information storage unit
33 content distribution condition list storage area
34 content storage area
35 network processing unit
36 apparatus usage information collection unit
37 condition comparison processing unit
38 content generating unit
39 content distribution processing unit

The invention claimed is:

1. An information distribution system comprising: an image forming apparatus and an information distribution apparatus connected through a network,
   the information distribution apparatus including first circuitry configured to:
      receive apparatus usage information indicating a usage situation of the image forming apparatus;
      generate distribution information to be displayed at the image forming apparatus based on the apparatus usage information and contract information; and
      distribute the distribution information to the image forming apparatus;
   the image forming apparatus including:
      a printer configured to print;
      a control panel configured to receive a user instruction to control the printer and display information;
      second circuitry configured to:
         send the apparatus usage information, including usage information of consumables, to the information distribution apparatus;
         receive the distribution information; and
         display the distribution information in the control panel;
   wherein in a case that the first circuitry determines that a contract status exists in the contract information, the first circuitry generates at least one of a usage data, a delivery status data, and a content status data, to be sent and displayed on the control panel as the distribution information;
   wherein in a case that the first circuitry determines that the contract status does not exist in the contract information, the first circuitry generates automatic delivery fosterage data to be sent and displayed on the control panel as the distribution information;

wherein in a case that the first circuitry determines that the contract information includes information indicating that a remote service contract and an automatic toner delivery contract exist, the first circuitry generates at least one of usage data and delivery status data to be sent and displayed on the control panel as the distribution information;

wherein in a case that the first circuitry determines that the contract information includes information indicating that a remote service contract exists and an automatic toner delivery contract does not exist, the first circuitry generates automatic delivery fosterage data to be sent and displayed on the control panel as the distribution information; and wherein the automatic delivery fosterage data is information indicating advantages of automatic toner delivery.

2. The information distribution system as claimed in claim 1, wherein the first circuitry is configured to:
store contract information indicating contracts for using the image forming apparatus, and
generate the distribution information based on the contract information and the apparatus usage information.

3. The information distribution system as claimed in claim 2, wherein the information distribution apparatus generates, based on the apparatus usage information, a usage situation report as the distribution information upon a provision of a service for reporting a usage situation being included in the contract information.

4. The information distribution system as claimed in claim 2, wherein the information distribution apparatus generates, based on the apparatus usage information, a delivery state report as the distribution information upon a provision of a service for automatically ordering being included in the contract information.

5. The information distribution system as claimed in claim 1,
wherein the image forming apparatus includes:
a main part including the printer, a first hardware processor, and a first hardware memory that contains first software configured to implement a printing function; and
an operational part including the control panel, a second hardware processor, and a second hardware memory that contains second software different than the first software; the second software configured to implement a user interface function and an information display function; and
wherein the main part and the operational part are independently operated with discrete operating systems.

6. The information distribution system as claimed in claim 5, wherein the main part and the operational part are independently operated with different types of operating systems.

7. The information distribution system as claimed in claim 6, wherein the first software includes Linux operating system software, and the second software includes Android operating system software.

8. An image forming apparatus connected to an information distribution apparatus through a network, comprising:
a printer configured to print;
a control panel configured to receive a user instruction to control the printer and display information;
circuitry configured to:
acquire distribution information distributed from the information distribution apparatus to the electronic apparatus, the information distribution apparatus collecting apparatus usage information indicating usage situation of the electronic apparatus to generate the distribution information based on the apparatus usage information; and
display the distribution information in the control panel;

wherein in a case that a contract status is determined to exist in contract information generated by the information distribution apparatus, the circuitry displays at least one of a usage data, a delivery status data, and a content status data, on the control panel as the distribution information;

wherein in a case that the contract status is determined not to exist in the contract information, the circuitry displays automatic delivery fosterage data on the control panel as the distribution information;

wherein in a case that the circuitry determines that the contract information includes information indicating that a remote service contract and an automatic toner delivery contract exist, the circuitry generates at least one of usage data and delivery status data to be sent and displayed on the control panel as the distribution information;

wherein in a case that the circuitry determines that the contract information includes information indicating that a remote service contract exists and an automatic toner delivery contract does not exist, the circuitry generates automatic delivery fosterage data to be sent and displayed on the control panel as the distribution information; and wherein the automatic delivery fosterage data is information indicating advantages of automatic toner delivery.

9. The image forming apparatus as claimed in claim 8, wherein the image forming apparatus comprises:
a main part including the printer, a first hardware processor, and a first hardware memory that contains first software configured to implement a printing function; and
an operational part including the control panel, a second hardware processor, and a second hardware memory that contains second software different than the first software; the second software configured to implement a user interface function and an information display function; and
wherein the main part and the operational part are independently operated with discrete operating systems.

10. The image forming apparatus as claimed in claim 9, wherein the main part and the operational part are independently operated with different types of operating systems.

11. The image forming apparatus as claimed in claim 10, wherein the first software includes Linux operating system software, and the second software includes Android operating system software.

12. A method performed by an information distribution apparatus and an image forming apparatus including a printer configured to print, in an information distribution system including the information distribution apparatus and the image forming apparatus connected through a network, the method comprising steps of:
receiving, by the information distribution apparatus, apparatus usage information indicating usage situation of the image forming apparatus;
generating, by the information distribution apparatus, distribution information to be displayed at the image forming apparatus based on the apparatus usage information and contract information;

distributing, by the information distribution apparatus, the distribution information to the image forming apparatus;

receiving, by a control panel of the image forming apparatus, a user instruction to control the printer and display information;

sending, by the image forming apparatus, the apparatus usage information including usage information of consumables, to the information distribution apparatus;

receiving, by the image forming apparatus, the distribution information; and displaying, by the image forming apparatus, the distribution information in the control panel;

determining, by the information distribution apparatus, that a contract status exists in the contract information, and thereafter generating, by the information distribution apparatus, at least one of a usage data, a delivery status data, and a content status data, to be sent and displayed on the control panel as the distribution information;

determining, by the information distribution apparatus, that the contract status does not exist in the contract information, and thereafter generating, by the information distribution apparatus, automatic delivery fosterage data to be sent and displayed on the control panel as the distribution information;

determining, by the information distribution apparatus, that the contract information includes information indicating that a remote service contract and an automatic toner delivery contract exist, and thereafter generating at least one of usage data and delivery status data to be sent and displayed on the control panel as the distribution information; and determining, by the information distribution apparatus that the contract information includes information indicating that a remote service contract exists and an automatic toner delivery contract does not exist, and thereafter generating automatic delivery fosterage data to be sent and displayed on the control panel as the distribution information, wherein the automatic delivery fosterage data is information indicating advantages of automatic toner delivery.

13. The method as claimed in claim 12, wherein the image forming apparatus includes the control panel, which is configured to receive the user instruction to control the printer and display information, a main part including the printer, a first hardware processor, and a first hardware memory that contains first software configured to implement a printing function; and an operational part including the control panel, a second hardware processor, and a second hardware memory that contains second software different than the first software; the second software configured to implement a user interface function and an information display function, and wherein the method further comprises a step of independently operating the main part and the operational part with discrete operating systems.

14. The method as claimed in claim 13, further comprising independently operating the main part and the operational part with different types of operating systems.

15. The method as claimed in claim 14, wherein the first software includes Linux operating system software, and the second software includes Android operating system software.

* * * * *